(12) United States Patent
Chae et al.

(10) Patent No.: US 11,677,079 B2
(45) Date of Patent: Jun. 13, 2023

(54) ELECTRODE FOR LITHIUM SECONDARY BATTERY AND MANUFACTURING METHOD THEREOF

(71) Applicant: LG CHEM, LTD., Seoul (KR)

(72) Inventors: Ohbyong Chae, Daejeon (KR); Sangwook Woo, Daejeon (KR); Yeri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 77 days.

(21) Appl. No.: 16/652,546

(22) PCT Filed: Jul. 11, 2019

(86) PCT No.: PCT/KR2019/008600
§ 371 (c)(1),
(2) Date: Mar. 31, 2020

(87) PCT Pub. No.: WO2020/045820
PCT Pub. Date: Mar. 5, 2020

(65) Prior Publication Data
US 2020/0243863 A1  Jul. 30, 2020

(30) Foreign Application Priority Data

Aug. 27, 2018 (KR) .......... 10-2018-0100361

(51) Int. Cl.
*H01M 4/64* (2006.01)
*H01M 4/62* (2006.01)
(Continued)

(52) U.S. Cl.
CPC ............ *H01M 4/628* (2013.01); *C23C 18/31* (2013.01); *H01M 4/0402* (2013.01);
(Continued)

(58) Field of Classification Search
None
See application file for complete search history.

(56) References Cited

U.S. PATENT DOCUMENTS 7,560,192 B2   7/2009   Hwang et al.
7,736,809 B2   6/2010   Hwang et al.
(Continued)

FOREIGN PATENT DOCUMENTS

| CN | 1492529 A | 4/2004 |
| CN | 101652885 A | 2/2010 |

(Continued)

OTHER PUBLICATIONS

Extended European Search Report, dated Jan. 25, 2021, for European Application No. 19855630.0.
(Continued)

*Primary Examiner* — Lucas J. O'Donnell
(74) *Attorney, Agent, or Firm* — Birch, Stewart, Kolasch & Birch, LLP

(57) ABSTRACT

An electrode for a lithium secondary battery, which may be applied to the lithium secondary battery to increase cycling performance and efficiency of the battery, and a manufacturing method thereof. When the electrode for the lithium secondary battery of the present invention is applied to the lithium secondary battery, uniform deposition and stripping of lithium metals occur throughout the surface of the electrode when charging/discharging the battery, thereby inhibiting uneven growth of lithium dendrites and improving cycle and efficiency characteristics of the battery. Further, the electrode for the lithium secondary battery of the present invention exhibits remarkably high flexibility, as compared with existing electrodes including a metal current collector (Continued)

and an active material layer, thereby improving processability during manufacture of the electrode and assembling the battery.

15 Claims, 2 Drawing Sheets

(51) Int. Cl.
| | |
|---|---|
| *C23C 18/31* | (2006.01) |
| *H01M 4/04* | (2006.01) |
| *H01M 4/134* | (2010.01) |
| *H01M 4/1395* | (2010.01) |
| *H01M 4/38* | (2006.01) |
| *H01M 10/052* | (2010.01) |
| *H01M 4/02* | (2006.01) |

(52) U.S. Cl.
CPC ......... *H01M 4/0452* (2013.01); *H01M 4/134* (2013.01); *H01M 4/1395* (2013.01); *H01M 4/382* (2013.01); *H01M 4/626* (2013.01); *H01M 10/052* (2013.01); *H01M 2004/021* (2013.01)

(56) References Cited

U.S. PATENT DOCUMENTS

| | | |
|---|---|---|
| 8,835,050 B2 | 9/2014 | Misumi et al. |
| 9,876,230 B2 | 1/2018 | George et al. |
| 2004/0081889 A1 | 4/2004 | Lee et al. |
| 2004/0241549 A1* | 12/2004 | Cho .................. H01M 4/66 429/246 |
| 2005/0074671 A1 | 4/2005 | Sugiyama et al. |
| 2005/0084760 A1* | 4/2005 | Hwang ................ H01M 4/667 429/234 |
| 2008/0131784 A1 | 6/2008 | Hwang et al. |
| 2008/0248386 A1 | 10/2008 | Obrovac et al. |
| 2009/0123838 A1 | 5/2009 | Misumi et al. |
| 2009/0280407 A1* | 11/2009 | Ito ........................ H01M 4/66 427/58 |
| 2012/0121983 A1 | 5/2012 | Yoon et al. |
| 2013/0011742 A1* | 1/2013 | Park ..................... H01M 4/667 429/234 |
| 2013/0164612 A1* | 6/2013 | Tanemura ........... H01M 4/1395 429/211 |
| 2013/0252068 A1 | 9/2013 | Lee et al. |
| 2017/0125818 A1* | 5/2017 | Shim ..................... H01G 11/54 |
| 2017/0214054 A1* | 7/2017 | Cui ....................... H01M 50/46 |

FOREIGN PATENT DOCUMENTS

| | | |
|---|---|---|
| CN | 103779579 A | 5/2014 |
| EP | 3079186 A1 | 10/2016 |
| JP | 2304-22466 A | 1/2004 |
| JP | 2004-127561 A | 4/2004 |
| JP | 2304-356082 A | 12/2004 |
| JP | 2005-108835 A | 4/2005 |
| JP | 2009-99512 A | 5/2009 |
| JP | 2009-123379 A | 6/2009 |
| JP | 2314-53130 A | 3/2014 |
| JP | 6235906 B2 | 11/2017 |
| KR | 10-2004-0102436 A | 12/2004 |
| KR | 10-2005-0030438 A | 3/2005 |
| KR | 10-2006-0130925 A | 12/2006 |
| KR | 10-0669338 B1 | 1/2007 |
| KR | 10-2012-0053180 A | 5/2012 |
| KR | 10-2013-0106681 A | 9/2013 |
| KR | 10-1502080 B1 | 3/2015 |
| KR | 10-2017-0098375 A | 8/2017 |
| KR | 10-2018-0091456 A | 8/2018 |

OTHER PUBLICATIONS

International Search Report issued in PCT/KR2019/008600 (PCT/ISA/210), dated Nov. 5, 2019.

* cited by examiner

【FIG. 1】
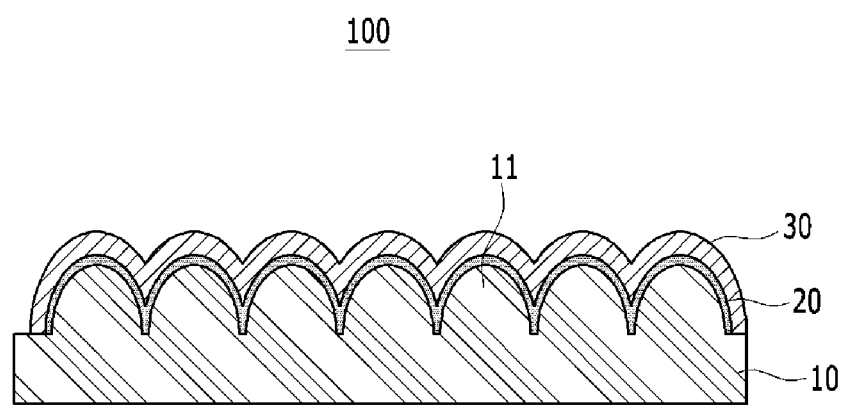
【FIG. 2】
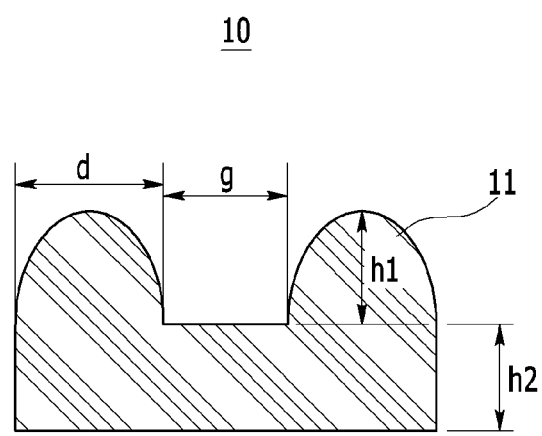

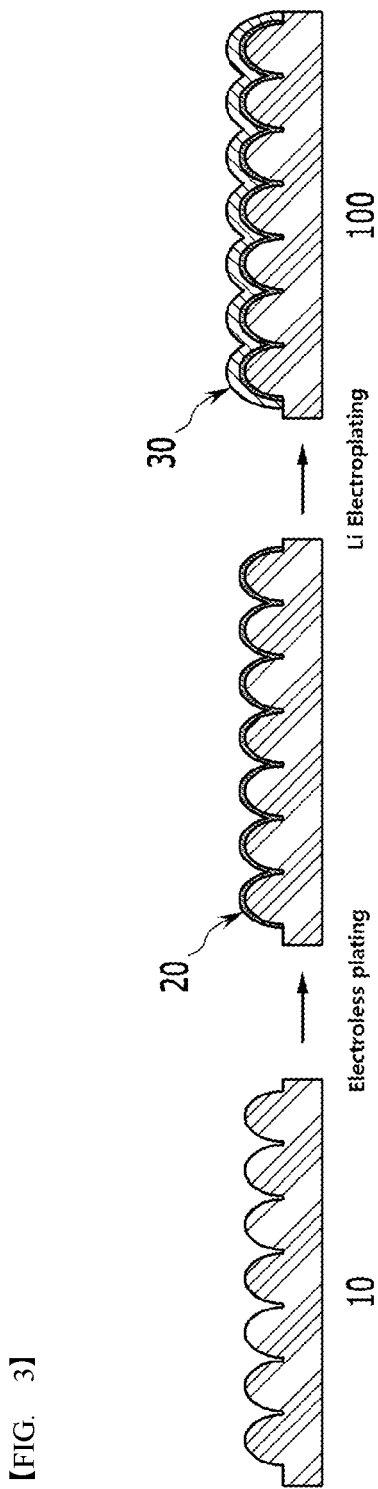
[FIG. 3]

ELECTRODE FOR LITHIUM SECONDARY BATTERY AND MANUFACTURING METHOD THEREOF

CROSS-REFERENCE TO RELATED APPLICATION

The present application is based on, and claims priority from, Korean Patent Application No. 10-2018-0100361, filed on Aug. 27, 2018, the disclosure of which is hereby incorporated by reference herein in its entirety.

TECHNICAL FIELD

The present invention relates to an electrode for a lithium secondary battery, which is applied to the lithium secondary battery to increase cycling performance and efficiency of the battery, and a manufacturing method thereof.

BACKGROUND ART

With rapid development of electronics, telecommunications, and computer industries, applications of energy storage technologies are expanding to camcorders, mobile phones, laptops, PCs, and even electric vehicles. Accordingly, a high-performance secondary battery with light weight, a long lifespan, and high reliability is under development.

Among the secondary batteries currently applied, lithium secondary batteries developed in the early 1990s have a high operating voltage and remarkably high energy density, as compared with conventional batteries such as Ni-MH, Ni—Cd, and sulfuric acid-lead batteries using an aqueous electrolyte solution, and thus lithium secondary batteries have received much attention.

As a negative electrode active material of lithium secondary batteries, a lithium metal, a carbon-based material, silicon, etc. is used. Among them, the lithium metal is advantageous in that the highest energy density may be obtained, and thus it has been continuously studied.

A lithium electrode using the lithium metal as an active material is commonly manufactured by attaching a lithium foil on a planar copper or nickel foil as a current collector. Alternatively, the lithium foil as it is may be used as the lithium electrode without a separate current collector.

However, such a lithium electrode has a problem in that uneven growth of lithium dendrites occurs on the surface during deposition and stripping of the lithium metal on the electrode when charging/discharging the battery. The lithium dendrites may cause damage to a separator and a short circuit of the lithium secondary battery to deteriorate safety of the battery, and therefore, there is a demand for improvement thereof.

DISCLOSURE

Technical Problem

An object of the present invention is to provide an electrode for a lithium secondary battery, which may improve cycle and efficiency characteristics of the lithium secondary battery by promoting uniform deposition and stripping of lithium metal when charging/discharging the battery, and a manufacturing method thereof.

Technical Solution

To achieve the above object, the present invention provides an electrode for a lithium secondary battery, the electrode including:

a polymer film having a pattern formed on a surface thereof, in which the pattern comprises a plurality of hemispherical protrusions and each hemispherical protrusion has a diameter of 5 μm to 50 μm and the hemispherical protrusions are uniformly arranged;

a conductive metal layer formed on the pattern of the polymer film; and a lithium metal layer formed on the conductive metal layer.

The hemispherical protrusions each may have a height of 3 μm to 50 μm.

Preferably, the hemispherical protrusions each may have a diameter of 7 μm to 40 μm and a height of 5 μm to 40 μm.

A distance between the hemispherical protrusions may be 2 μm to 50 μm.

The polymer film may be one or more selected from the group consisting of polyethylene terephthalate, polybutylene terephthalate, polyethylene naphthalate, polyethylene, polypropylene, polybutene, polyphenyl sulfide, polyethylene sulfide, polyimide, and Teflon.

The polymer film may have a thickness of 5 μm to 30 μm, and the thickness excludes a height of the hemispherical protrusions.

The conductive metal may be one or more selected from the group consisting of Ni, Ti, Cu, Ag, Au, Pt, Fe, Co, Cr, W, Mo, Al, Mg, K, Na, Ca, Sr, Ba, Si, Ge, Sb, Pb, In, and Zn.

The conductive metal layer may have a thickness of 0.5 μm to 10 μm.

The lithium metal layer may have a thickness of 5 μm to 50 μm.

Further, the present invention provides a lithium secondary battery including the electrode for the lithium secondary battery.

In addition, the present invention provides a method of manufacturing the electrode for the lithium secondary battery, the method including the steps of:

preparing the polymer film having the pattern formed on a surface thereof, in which the pattern comprises a plurality of hemispherical protrusions and each hemispherical protrusion has a diameter of 5 μm to 50 μm and the hemispherical protrusions are uniformly arranged;

forming the conductive metal layer by electroless plating a conductive metal precursor onto the polymer film having the pattern; and forming the lithium metal layer by electroplating a lithium metal onto the conductive metal layer.

The conductive metal precursor may be one or more selected from the group consisting of a sulfate, halide, nitrate, and hydroxide of Ni, Ti, Cu, Ag, Au, Pt, Fe, Co, Cr, W, Mo, Al, Mg, K, Na, Ca, Sr, Ba, Si, Ge, Sb, Pb, In, or Zn.

In the electroless plating step, one or more selected from the group consisting of glycine, formaldehyde, hydrazine, and citric acid may be used as a reducing agent.

The conductive metal layer may be formed in a thickness of 0.5 μm to 10 μm.

The lithium metal layer may be formed in a thickness of 5 μm to 50 μm.

Effect of the Invention

When an electrode for a lithium secondary battery of the present invention is applied to a lithium secondary battery, uniform deposition and stripping of a lithium metal occur throughout the surface of the electrode when charging/discharging the battery, and thus uneven formation of lithium dendrites may be prevented, thereby improving cycle and efficiency characteristics of the battery.

Further, the electrode for the lithium secondary battery of the present invention may exhibit remarkably high flexibility, as compared with existing electrodes including a metal current collector and an active material layer, thereby improving processability during manufacture of the electrode and assembling the battery.

BRIEF DESCRIPTION OF DRAWINGS

FIG. 1 is a cross-sectional view of an electrode for a lithium secondary battery according to one embodiment of the present invention;

FIG. 2 is a cross-sectional view showing a shape of a polymer film of the present invention; and FIG. 3 illustrates a method of manufacturing the electrode for the lithium secondary battery according to one embodiment of the present invention.

BEST MODE FOR CARRYING OUT THE INVENTION

The terms used in this description are just for explaining exemplary embodiments and are not intended to restrict the present invention. The singular expression may include the plural expression unless it is differently expressed contextually. It must be understood that the term "include", "equip", or "have" in the present description is only used for designating the existence of characteristics, steps, components, or combinations thereof, and does not exclude the existence or the possibility of addition of one or more different characteristics, steps, components, or combinations thereof beforehand.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Likewise, the accompanying drawings are shown to describe one exemplary embodiment of the present invention, and thus the present invention can be implemented in several different forms, and thus is not limited to the embodiments described herein. In order to describe the present invention with greater clarity, certain parts that are irrelevant to the description have been omitted in the drawings, and like parts have like reference numerals throughout the specification. Also, the sizes and relative sizes of parts shown in the drawings are irrelevant to their actual scales, and may be exaggerated or diminished for the sake of convenience of description.

Electrode for Lithium Secondary Battery and Manufacturing Method Thereof

The present invention relates to an electrode for a lithium secondary battery, the electrode including:

a polymer film having a pattern formed on one surface thereof, in which a plurality of hemispherical protrusions having a diameter of 5 μm to 50 μm are regularly arranged;

a conductive metal layer formed on the pattern of the polymer film; and a lithium metal layer formed on the conductive metal layer.

FIG. 1 illustrates a structure of an electrode for a lithium secondary battery 100 according to one embodiment of the present invention.

The electrode for the lithium secondary battery of the present invention has a structure in which a conductive metal layer 20 and a lithium metal layer 30 are sequentially stacked on a polymer film 10 having a pattern formed on one surface thereof. The polymer film 10 serves as a support for the conductive metal layer 20 and the lithium metal layer 30. The pattern formed on the polymer film has a shape in which a plurality of hemispherical protrusions 11 are regularly arranged. Since the thin conductive metal layer 20 and the lithium metal layer 30 are stacked on the pattern shape, the surface of the electrode to be finally manufactured has a plurality of hemispherical protrusions according to the pattern shape of the polymer film 10. In this regard, the 'hemispherical protrusion' refers to a hemisphere-like shape protrusion, in which outer circumference of the protrusion is curved, and it does not necessarily mean the hemispherical shape.

As described, when the pattern of hemispherical protrusions is formed on the surface of the electrode, a uniform current flow on the surface of the electrode may be induced when charging/discharging the battery, and as a result, uniform deposition and stripping of a lithium metal on the surface may occur, which may remarkably inhibit uneven growth of lithium dendrites. Therefore, the electrode for the lithium secondary battery of the present invention may have greatly improved stability, cycle characteristics, and efficiency during operation of lithium secondary battery. Meanwhile, as confirmed in an experimental example below, the effect of inducing the uniform current flow may be obtained when the outer circumference of the protrusions of the pattern is curved, and it is difficult to expect the effect of dispersing current density when the protrusions include an angled part such as a regular hexahedral shape. Further, even though the outer circumference of the hemispherical protrusions is curved, the effect may be ensured only when the diameter of the protrusions satisfies an appropriate range.

To ensure the above effect, the diameter of the hemispherical protrusion 11 in the pattern of the polymer film 10 is preferably 5 μm or more, 7 μm or more, or 10 μm or more, and 50 μm or less, 40 μm or less, or 30 μm or less. As illustrated in FIG. 2, the diameter d of the hemispherical protrusion means the longest straight distance from one side of the lowermost portion of the hemispherical protrusion to the other side. If the diameter of the hemispherical protrusion is less than 5 μm, the shape of the pattern may become less visible on the surface of the lithium metal layer of the electrode finally manufactured by stacking the conductive metal layer 20 and the lithium metal layer 30, and if the diameter of the hemispherical protrusion is as large as more than 50 μm, it is difficult to ensure the effect of dispersing current density by the patterning. Accordingly, it is preferable that the diameter satisfies the above range.

Meanwhile, a height h1 of the hemispherical protrusion 11 means a height from the lowermost portion to the uppermost portion of the hemispherical protrusion, and is preferably 3 μm or more, 5 μm or more, or 10 μm or more, and 50 μm or less, 40 μm or less, or 30 μm or less. If the height of the hemispherical protrusion 11 is less than 3 μm, the shape of the pattern may become less visible on the electrode finally manufactured, while if the height of the hemispherical protrusion 11 is more than 50 μm, the electrode becomes too thick, and thus there is a problem in that the energy density is reduced.

Further, as illustrated in FIG. 2, a distance g between the hemispherical protrusions 11 means the shortest straight distance from one side of the lowermost portion of one hemispherical protrusion to the other side of another hemispherical protrusion, and the distance between the hemispherical protrusions is preferably 50 μm or less, 40 μm or less, or 30 μm or less. One hemispherical protrusion and another hemispherical protrusion may be arranged such that there is no gap therebetween. Thus, the lower limit of the distance between the hemispherical protrusions is not restricted, but the distance may be preferably 2 μm or more, or 3 μm or more, taking into consideration the thickness of the conductive metal layer and the lithium metal layer stacked on the polymer film.

If the polymer film is too thick, flexibility of the electrode is reduced, and on the contrary, if the polymer film is too thin, it does not serve as a support, which may impair processability during manufacture of the electrode and assembling the battery. Therefore, the thickness h2 of the polymer film, excluding the height of the hemispherical protrusion, is preferably in the range of 5 μm to 30 μm, or 8 μm to 15 μm.

Meanwhile, a material of the polymer film is not particularly limited, but a polymer that has flexibility, does not easily react with an organic electrolyte solution, and is not easily broken due to excellent tensile strength may be suitably used. For example, the material of the polymer film which is applicable in the present invention may be one or more selected from the group consisting of polyethylene terephthalate, polybutylene terephthalate, polyethylene naphthalate, polyethylene, polypropylene, polybutene, polyphenyl sulfide, polyethylene sulfide, polyimide, and Teflon, but is not limited thereto. Among them, polyethylene terephthalate (PET), polyimide, or Teflon having excellent flexibility and strength characteristics is preferred, and PET is more preferred.

In the present invention, the conductive metal layer 20 is composed of a conductive metal which may serve as a current collector, and as the conductive metal, any type commonly used in a negative electrode current collector of a lithium secondary battery may be used without limitation. For example, the conductive metal may be one or more selected from the group consisting of Ni, Ti, Cu, Ag, Au, Pt, Fe, Co, Cr, W, Mo, Al, Mg, K, Na, Ca, Sr, Ba, Si, Ge, Sb, Pb, In, and Zn, and taking conductivity and economical efficiency into consideration, Ni, Cu, or Ti may be preferred, and Ni may be more preferred.

A thickness of the conductive metal layer 20 may be in the range of 0.5 μm to 10 μm, 1 μm to 7 μm, or 2 μm to 5 μm. If the thickness of the conductive metal layer 20 is as thick as more than 10 μm, energy density may be reduced to deteriorate the performances of the battery, the pattern formed on the polymer film 10 may not become visible on the surface of the finally manufactured electrode, and it is difficult to secure the effect of the present invention. On the contrary, if the thickness is as thin as less than 0.5 μm, the uniform conductive metal layer is not formed, and there is a problem in that it is difficult to secure the sufficient conductivity. Therefore, it is preferable that the thickness satisfies the above range.

The electrode for the lithium secondary battery of the present invention includes a lithium metal as an active material. The lithium metal layer 30 is formed on the conductive metal layer 20, and preferably has a thickness of 5 μm or more, or 10 μm or more for stable charging/discharging of the electrode. Meanwhile, if the lithium metal layer 30 is too thick, the pattern formed on the polymer film 10 may not become visible on the lithium metal layer 30, and thus it is difficult to achieve the effects of the present invention. Therefore, the thickness of the lithium metal layer 30 is preferably 50 μm or less, or 40 μm or less.

A method of manufacturing the electrode for the lithium secondary battery of the present invention is not particularly limited. However, as illustrated in FIG. 3, the method may include the steps of: preparing the polymer film having the pattern formed on one surface thereof, in which a plurality of hemispherical protrusions having a diameter of 5 μm to 50 μm are regularly arranged; forming the conductive metal layer by electroless plating a conductive metal precursor onto the pattern of the polymer film; and forming the lithium metal layer by electroplating the lithium metal onto the conductive metal layer. This method may be further specified by the following examples.

As the polymer film, those which are commercially available or directly manufactured may be used. When the polymer film directly manufactured is used, a manufacturing method thereof is not limited, and various methods such as extrusion molding, injection molding, a solution casting method, etc. known in the art may be applied. A method of forming the pattern on the polymer film is not particularly limited, but a method of placing a planar polymer film on a mold, and pressing and/or heating the polymer film to form the pattern may be used.

The step of forming the conductive metal layer may be performed by electroless plating a conductive metal precursor. The electroless plating may be a method of reducing metal ions of metal salts in an aqueous solution into metals by using a reducing agent, thereby precipitating the metals on the surface of a subject to be treated. A common electroless plating method known in the art may be used without limitation.

The conductive metal precursor used in the step of electroless plating may be a sulfate, halide, nitrate, or hydroxide of Ni, Ti, Cu, Ag, Au, Pt, Fe, Co, Cr, W, Mo, Al, Mg, K, Na, Ca, Sr, Ba, Si, Ge, Sb, Pb, In, or Zn. The conductive metal precursor is preferably used in the range of 0.1 M to 3 M, or 0.5 M to 1.5 M such that a sufficient amount of the conductive metal layer may be formed on the polymer film.

As the reducing agent in the step of electroless plating, glycine, formaldehyde, hydrazine, citric acid, etc. may be used, and this reducing agent may be used in an appropriate range according to the number of moles of the used conductive metal precursor. For example, when the conductive metal precursor includes a monovalent metal ion, the reducing agent may be used in the range of 0.1 M to 3 M or 0.5 M to 1.5 M. When the conductive metal precursor includes a divalent metal ion, the reducing agent may be used in the range of about twice the above concentration (in the range of 0.2 M to 6 M or 1 M to 3 M). When the conductive metal precursor includes a trivalent metal ion, the reducing agent may be used in the range of about three times the above concentration (in the range of 0.3 M to 9 M or 1.5 M to 4.5 M).

Meanwhile, in the step of electroless plating, the conductive metal precursor solution and the reducing agent solution may be fed not at once but continuously at a constant rate into an electrolyzer, in which the polymer film to be treated and water are placed. When the conductive metal precursor solution and the reducing agent solution are fed at once into the electrolyzer, uniform electroless plating may not occur on the polymer film, and uniform formation of the conductive metal layer may not occur. On the contrary, when they are fed continuously, the uniform conductive metal layer may be preferably obtained. For example, the conductive metal precursor solution and the reducing agent solution may be fed at a rate of 0.05 ml/min to 1 ml/min, or 0.1 ml/min to 0.5 ml/min, and the feeding time (reaction time) may be 20 minutes to 5 hours, or 30 minutes to 3 hours.

Formation of the lithium metal layer may be performed by electroplating lithium metals. The electroplating may be performed in the presence of lithium salts in a non-aqueous solvent. The non-aqueous solvent may be one or more selected from the group consisting of organic solvents of 1,4-dioxane, 1,2-dimethoxyethane, tetrahydrofuran, dichloromethane, N-methylpyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydroxy franc, 2-methyl tetrahydrofuran, dimethyl sulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Further, the lithium salt may be one or more selected from the group consisting of LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, LiC$_4$BO$_8$, LiCF$_3$CO$_2$, LiCH$_3$SO$_3$, LiCF$_3$SO$_3$, LiN(SO$_2$F)$_2$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)$_2$NLi, lithium chloroborane, a lower aliphatic carboxylic acid lithium, lithium tetraphenyl borate, and lithium imide. Among them, taking reactivity into consideration, one or more selected from the group consisting of LiN(SO$_2$F)$_2$, LiCl, and LiPF$_6$ may be more preferably used.

The process conditions of the electroplating step are not particularly limited. However, for example, the polymer film on which the conductive metal layer is formed may be placed in the electrolyzer containing the non-aqueous solvent and lithium salts, and then a current of 0.1 mA/cm$^2$ to 10 mA/cm$^2$ may be applied thereto at room temperature of 20° C. to 30° C.

Lithium Secondary Battery

The present invention provides a lithium secondary battery including the above-described electrode for the lithium secondary battery. The lithium secondary battery of the present invention includes a positive electrode, a negative electrode, a separator interposed therebetween, and an electrolyte, and the electrode for the lithium secondary battery is preferably used as the negative electrode. As described, when the lithium electrode of the present invention is used as the negative electrode, growth of lithium dendrites may be remarkably inhibited during charging/discharging the lithium secondary battery of the present invention. As a result, cycle and efficiency characteristics of the battery may be secured, and stability of the battery may be improved.

The configuration of the positive electrode, the separator, and the electrolyte of the lithium secondary battery is not particularly limited in the present invention, and it follows those known in the art.

(1) Positive Electrode

The positive electrode includes a positive electrode active material formed on a positive electrode current collector.

The positive electrode current collector is not particularly limited as long as it has high conductivity without causing chemical changes in the corresponding battery. For example, stainless steel, aluminum, nickel, titanium, fired carbon, or aluminum or stainless steel that is surface-treated with carbon, nickel, titanium, or silver may be used. In this regard, the positive electrode current collector may be in a variety of forms such as a film, a sheet, a foil, a net, a porous material, a foamed material, a non-woven fabric material, etc. which has fine roughness on the surface thereof so as to reinforce adhesion of the positive electrode active material.

The positive electrode active material constituting the electrode layer may be any positive electrode active material which may be used in the art. Specific examples of the positive electrode active material may include: lithium metals; lithium cobalt oxides such as LiCoO$_2$, etc.; lithium manganese oxides such as Li$_{1+x}$Mn$_{2-x}$O$_4$ (wherein x is 0 to 0.33), LiMnO$_3$, LiMn$_2$O$_3$, LiMnO$_2$, etc.; lithium copper oxides such as Li$_2$CuO$_2$, etc.; vanadium oxides such as LiV$_3$O$_8$, LiFe$_3$O$_4$, V$_2$O$_5$, Cu$_2$V$_2$O$_7$, etc.; lithium nickel oxides represented by LiNi$_{1-x}$M$_x$O$_2$ (wherein M is Co, Mn, Al, Cu, Fe, Mg, B, or Ga, and x is 0.01 to 0.3); lithium manganese complex oxides represented by LiMn$_{2-x}$M$_x$O$_2$ (wherein M is Co, Ni, Fe, Cr, Zn, or Ta, and x is 0.01 to 0.1) or Li$_2$Mn$_3$MO$_8$ (wherein M is Fe, Co, Ni, Cu, or Zn); lithium-nickel-manganese-cobalt oxides represented by Li(Ni$_a$Co$_b$Mn$_c$)O$_2$ (wherein 0<a<1, 0<b<1, 0<c<1, a+b+c=1); vanadium oxides such as LiV$_3$O$_8$, LiFe$_3$O$_4$, V$_2$O$_5$, Cu$_2$V$_2$O$_7$, etc.; sulfur or disulfide compounds; a phosphate such as LiFePO$_4$, LiMnPO$_4$, LiCoPO$_4$, LiNiPO$_4$, etc.; Fe$_2$(MoO$_4$)$_3$, etc., but are not limited thereto.

In this regard, the electrode layer may further include a binder resin, a conductive material, a filler, other additives, etc., in addition to the positive electrode active material.

The binder resin is used for binding of the electrode active material and the conductive material and binding with respect to the current collector. Non-limiting examples of the binder resin may include polyvinylidene fluoride (PVDF), polyvinyl alcohol (PVA), polyacrylic acid (PAA), polymethacrylic acid (PMA), polymethylmethacrylate (PMMA), polyacrylamide (PAM), polymethacrylamide, polyacrylonitrile (PAN), polymethacrylonitrile, polyimide (PI), alginic acid, alginate, chitosan, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber (SBR), fluorine rubber, various copolymers thereof, etc.

The conductive material is used to further improve conductivity of the electrode active material. The conductive material is not particularly limited, as long as it has conductivity without causing chemical changes in the corresponding battery. Examples thereof may include: graphite such as natural or artificial graphite; carbon black such as carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; and polyphenylene derivatives, etc.

The filler is a component optionally used to inhibit expansion of the electrode. The filler is not particularly limited, as long as it is a fibrous material without causing chemical changes in the corresponding battery. For example, olefinic polymers such as polyethylene, polypropylene, etc.; and fibrous materials such as glass fibers, carbon fibers, etc. may be used.

(2) Separator

The separator may be composed of a porous substrate. As the porous substrate, any porous substrate may be used, as long as it is commonly used in an electrochemical device. For example, a polyolefin-based porous film or non-woven fabric may be used, but is not particularly limited thereto.

The separator may be a porous substrate composed of any one selected from the group consisting of polyethylene, polypropylene, polybutylene, polypentene, polyethylene terephthalate, polybutylene terephthalate, polyester, polyacetal, polyamide, polycarbonate, polyimide, polyetheretherketone, polyethersulfone, polyphenylene oxide, polyphenylene sulfide, and polyethylene naphthalate, or a mixture of two or more thereof.

(3) Electrolyte

The electrolyte of the lithium secondary battery may be a non-aqueous electrolyte solution containing lithium salts and a non-aqueous organic solvent, an organic solid electrolyte, or an inorganic solid electrolyte, but is not limited thereto.

The non-aqueous organic solvent may be, for example, a non-protic organic solvent, such as N-methyl-2-pyrrolidone, propylene carbonate, ethylene carbonate, butylene carbonate, dimethyl carbonate, diethyl carbonate, ethyl methyl carbonate, gamma butyrolactone, 1,2-dimethoxy ethane, 1,2-diethoxy ethane, tetrahydroxy franc, 2-methyl tetrahydrofuran, dimethyl sulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The lithium salt is a material that is readily soluble in the non-aqueous electrolyte, and may include, for example, $LiCl$, $LiBr$, $LiI$, $LiClO_4$, $LiBF_4$, $LiB_{10}Cl_{10}$, $LiPF_6$, $LiAsF_6$, $LiSbF_6$, $LiAlCl_4$, $LiSCN$, $LiC_4BO_8$, $LiCF_3CO_2$, $LiCH_3SO_3$, $LiCF_3SO_3$, $LiN(SO_2F)_2$, $LiN(SO_2CF_3)_2$, $LiN(SO_2C_2F_5)_2$, $LiC_4F_9SO_3$, $LiC(CF_3SO_2)_3$, $(CF_3SO_2)_2NLi$, lithium chloroborane, a lower aliphatic carboxylic acid lithium, lithium tetraphenyl borate, lithium imide, etc.

The organic solid electrolyte may include, for example, polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing secondary dissociation groups, etc.

The inorganic solid electrolyte may include, for example, Li-based nitrides, halides, or sulfates such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$-$LiT$-$LiOH$, $Li_3PO_4$—$Li_2S$—$SiS_2$, etc.

Further, the electrolyte may further include other additives in order to improve charge/discharge characteristics, flame retardancy, etc. Examples of the additives may include pyridine, triethyl phosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkylether, ammonium salts, pyrrole, 2-methoxy ethanol, aluminum trichloride, fluoroethylene carbonate (FEC), propene sultone (PRS), vinylene carbonate (VC), etc.

The lithium secondary battery according to the present invention may be subjected to lamination (stacked) and folding processes of the separator and the electrode, in addition to a general process of winding. Further, the battery case may be cylindrical, square, a pouch-type, a coin-type, etc.

Hereinafter, preferred examples are provided for better understanding of the present invention. However, the following examples are for illustrative purposes only, and it is apparent to those skilled in the art that various changes and modifications are possible within the scope and technical spirit of the present invention, and these changes and modifications belong to the scope of the appended claims.

Example 1

<Manufacture of Electrode for Lithium Secondary Battery>

A PET film (thickness excluding the height of the protrusions: 10 μm) with a pattern of hemispherical protrusions (diameter: 10 μm, height: 10 μm, space between protrusions: 5 μm) was immersed in a water tank containing water, and then nickel sulfate (1 M) and glycine (1 M) were introduced at a rate of 0.15 mL/min for 2 hours to perform Ni electroless plating. The manufactured Ni/PET film (thickness of Ni layer: 2 μm) was washed with distilled water, followed by drying.

The manufactured Ni/PET film was put in 1 M LiFSI-dissolved 1,4-dioxane (DX):1,2-dimethoxyethane (DME) solution (1:2, v/v), and current of 1 $mA/cm^2$ was applied at room temperature (25° C.) to perform Li electroplating. In this regard, as an electroplating machine, PESC05 of PNE Solution Co., Ltd. was used. Through this procedure, an electrode for a lithium secondary battery was obtained, the electrode being plated with the lithium metal at a thickness of 20 μm, having Li/Ni/PET sequentially stacked, and having a plurality of regular hemispherical protrusions.

<Manufacture of Symmetric Cell>

A symmetric cell was manufactured by interposing a polyolefin separator between the manufactured electrodes for the lithium secondary battery, and an electrolyte solution, in which 1 M $LiPF_6$ was dissolved in a mixed solvent of ethylene carbonate (EC) and diethyl carbonate (DEC) at a volume ratio of 50:50, was injected to manufacture a coin-type cell.

<Manufacture of Full Cell>

A full cell was manufactured by interposing a polyolefin separator between the manufactured electrode for the lithium secondary battery (negative electrode) and a positive electrode manufactured by coating one surface of an aluminum current collector with a slurry at a thickness of 65 μm, followed by drying and rolling, in which the slurry was prepared by adding 96% by weight of $LiCoO_2$ as a positive electrode active material, 2% by weight of Denka black (conductive material), and 2% by weight of PVdF (polyvinylidene fluoride, binder) to NMP (N-methyl-2-pyrrolidone). Then, an electrolyte solution, in which 1 M $LiPF_6$ was dissolved in a mixed solvent of ethylene carbonate (EC) and diethyl carbonate (DEC) at a volume ratio of 50:50, was injected to manufacture a coin-type cell.

Example 2

An electrode for a lithium secondary battery and a coin-type cell including the same were manufactured in the same manner as in Example 1, except that a PET film having hemispherical protrusions of 20 μm in diameter was used.

Example 3

An electrode for a lithium secondary battery and a coin-type cell including the same were manufactured in the same manner as in Example 1, except that a PET film having hemispherical protrusions of 40 μm in diameter was used.

Example 4

An electrode for a lithium secondary battery and a coin-type cell including the same were manufactured in the same manner as in Example 1, except that a PET film having hemispherical protrusions of 20 μm in height was used.

Example 5

An electrode for a lithium secondary battery and a coin-type cell including the same were manufactured in the same manner as in Example 1, except that a PET film having hemispherical protrusions of 10 μm in distance was used.

Comparative Example 1

An electrode for a lithium secondary battery and a coin-type cell including the same were manufactured in the same manner as in Example 1, except that a PET film having no pattern of hemispherical protrusions was used.

Comparative Example 2

A coin-type cell was manufactured in the same manner as in Example 1, except that a non-treated lithium metal foil (20 μm) was used as the electrode for the lithium secondary battery.

Comparative Example 3

An electrode for a lithium secondary battery and a coin-type cell including the same were manufactured in the same manner as in Example 1, except that a PET film not having hemispherical protrusions but having regular hexahedral protrusions of 10 nm in the length of one side was used.

Comparative Example 4

An electrode for a lithium secondary battery and a coin-type cell including the same were manufactured in the same manner as in Example 1, except that a PET film having hemispherical protrusions of 4 μm in diameter was used.

Comparative Example 5

An electrode for a lithium secondary battery and a coin-type cell including the same were manufactured in the same manner as in Example 1, except that a PET film having hemispherical protrusions of 60 μm in diameter was used.

Experimental Example 1

Each of the coin-type symmetric cells manufactured in the examples and comparative examples was repeatedly charged/discharged using an electrochemical charger/discharger (PNE Solution, PESC05) at a current density of 1 mA/cm$^2$ for 1 h. Comparison of overvoltage at the 100$^{th}$ cycle with overvoltage at the 1$^{st}$ cycle is shown in the following Table 1.

Experimental Example 2

Each of the coin-type full cells manufactured in the examples and comparative examples was charged/discharged using an electrochemical charger/discharger (PNE Solution, PESC05). Charging was performed up to the voltage of 4.4 V vs. Li/Li$^+$, and discharging was performed up to the voltage of 3.0 V vs. Li/Li$^+$, and current density of 0.5C-rate was applied. Comparison of discharge capacity at the 100$^{th}$ cycle with discharge capacity at the 1st cycle is shown in the following Table 1.

TABLE 1

| | Shape of protrusion pattern (μm) | | | Increase rate of overvoltage at 100$^{th}$ cycle with respect to overvoltage at 1$^{st}$ cycle (%) | Discharge capacity at 100$^{th}$ cycle with respect to discharge capacity at 1$^{st}$ cycle (%) |
|---|---|---|---|---|---|
| | Shape and Diameter | Height | Distance | | |
| Example 1 | Hemispherical, 10 | 10 | 5 | 12 | 93 |
| Example 2 | Hemispherical, 20 | 10 | 5 | 15 | 92 |
| Example 3 | Hemispherical, 40 | 10 | 5 | 17 | 92 |
| Example 4 | Hemispherical, 10 | 20 | 5 | 13 | 93 |
| Example 5 | Hemispherical, 10 | 10 | 10 | 15 | 92 |
| Comparative Example 1 | No pattern | | | 37 | 52 |
| Comparative Example 2 | No pattern (lithium metal foil) | | | 41 | 49 |
| Comparative Example 3 | Regular hexahedral, 10 | 10 | 10 | 27 | 85 |
| Comparative Example 4 | Hemispherical, 4 | 10 | 10 | 32 | 83 |
| Comparative Example 5 | Hemispherical, 60 | 10 | 10 | 29 | 84 |

As an experimental result, Examples 1 to 5 showed a remarkably low increase rate in the overvoltage at the 100th cycle and remarkably high discharge capacity at the 100$^{th}$ cycle with respect to the 1st cycle, as compared with Comparative Examples 1 and 2. The reason is that the electrode has hemispherical patterns on the surface thereof, and thus uniform lithium deposition and stripping occurred throughout the surface of the electrode when charging and discharging the battery. In contrast, Comparative Example 1 and 2 having no patterns on the surface of the electrode showed a rapid increase in the overvoltage and a remarkable reduction in the discharge capacity, indicating that uneven lithium deposition and stripping occurred due to the current concentration on a specific area of the surface of lithium metal.

Meanwhile, when the protrusions of the pattern are not hemispherical but angled as a regular hexahedral shape, as in Comparative Example 3, the increase rate of overvoltage was increased, and the discharge capacity was decreased, as compared with those of Examples 1 to 5. It is likely that this is because the current density in the angled corners was increased, which impedes uniform charging and discharging.

Further, Comparative Examples 4 to 5 showed a high increase rate of overvoltage and a low discharge capacity, as compared with Examples 1 to 5. It is likely that this is because the diameter of the hemispherical protrusions is too small or too large, and thus the effect of uniformly dispersing the current was rather decreased. These results suggest that the diameter of the hemispherical protrusions must satisfy the range of 5 µm to 50 µm to secure the effects of the present invention.

REFERENCE NUMERALS

10: Polymer film having pattern on one surface
11: Hemispherical protrusion
20: Conductive metal layer
30: Lithium metal layer
100: Electrode for lithium secondary battery

The invention claimed is:

1. An electrode for a lithium secondary battery, the electrode comprising:
 a single layer polymer film comprising a pattern formed on a surface thereof,
 wherein the pattern comprises a plurality of hemispherical protrusions and each hemispherical protrusion has a diameter of 5 µm to 50 µm, the hemispherical protrusions each have a height of 3 µm to 50 µm, and the hemispherical protrusions are uniformly arranged;
 a conductive metal layer formed on the surface of the pattern of the polymer film directly; and
 a lithium metal layer formed on the conductive metal layer.

2. The electrode for the lithium secondary battery of claim 1, wherein the hemispherical protrusions each have a diameter of 7 µm to 40 µm and a height of 5 µm to 40 µm.

3. The electrode for the lithium secondary battery of claim 1, wherein a distance between the hemispherical protrusions is 2 µm to 50 µm.

4. The electrode for the lithium secondary battery of claim 1, wherein the polymer film comprises one or more selected from the group consisting of polyethylene terephthalate, polybutylene terephthalate, polyethylene naphthalate, polyethylene, polypropylene, polybutene, polyphenyl sulfide, polyethylene sulfide, polyimide, and Teflon.

5. The electrode for the lithium secondary battery of claim 1, wherein the polymer film has a thickness of 5 µm to 30 µm, and the thickness excludes a height of the hemispherical protrusions.

6. The electrode for the lithium secondary battery of claim 1, wherein the conductive metal comprises one or more selected from the group consisting of Ni, Ti, Cu, Ag, Au, Pt, Fe, Co, Cr, W, Mo, Al, Mg, K, Na, Ca, Sr, Ba, Si, Ge, Sb, Pb, In, and Zn.

7. The electrode for the lithium secondary battery of claim 1, wherein the conductive metal layer has a thickness of 0.5 µm to 10 µm.

8. The electrode for the lithium secondary battery of claim 1, wherein the lithium metal layer has a thickness of 5 µm to 50 µm.

9. A lithium secondary battery comprising the electrode for the lithium secondary battery of claim 1.

10. A method of manufacturing an electrode for a lithium secondary battery, the method comprising the steps of:
 preparing a single layer polymer film comprising a pattern formed on a surface-thereof, wherein the pattern comprises a plurality of hemispherical protrusions and each hemispherical protrusion has a diameter of 5 µm to 5 µm, the hemispherical protrusions each have a height of 3 µm to 50 µm, and the hemispherical protrusions are uniformly arranged;
 forming a conductive metal layer by electroless plating a conductive metal precursor onto the surface of the pattern of the polymer film directly; and
 forming a lithium metal layer by electroplating a lithium metal onto the conductive metal layer.

11. The method of manufacturing the electrode for the lithium secondary battery of claim 10, wherein the conductive metal precursor comprises one or more selected from the group consisting of a sulfate, halide, nitrate, and hydroxide of Ni, Ti, Cu, Ag, Au, Pt, Fe, Co, Cr, W, Mo, Al, Mg, K, Na, Ca, Sr, Ba, Si, Ge, Sb, Pb, In, or Zn.

12. The method of manufacturing the electrode for the lithium secondary battery of claim 10, wherein, in the electroless plating step, as a reducing agent, one or more selected from the group consisting of glycine, formaldehyde, hydrazine, and citric acid is used.

13. The method of manufacturing the electrode for the lithium secondary battery of claim 10, wherein the conductive metal layer has a thickness of 0.5 µm to 10 µm.

14. The method of manufacturing the electrode for the lithium secondary battery of claim 10, wherein the lithium metal layer has a thickness of 5 µm to 50 µm.

15. The electrode for the lithium secondary battery of claim 3, wherein the distance between the hemispherical protrusions is measured between a first hemispherical protrusion and a second hemispherical protrusion, as a shortest straight distance from one side of a lowermost portion of the first hemispherical protrusion to one side of a lowermost portion of the second hemispherical protrusion.

* * * * *